Feb. 4, 1958 — J. L. BUTLER — 2,822,540
AIRCRAFT INSTRUMENT LANDING SYSTEM
Filed March 17, 1955 — 3 Sheets-Sheet 1
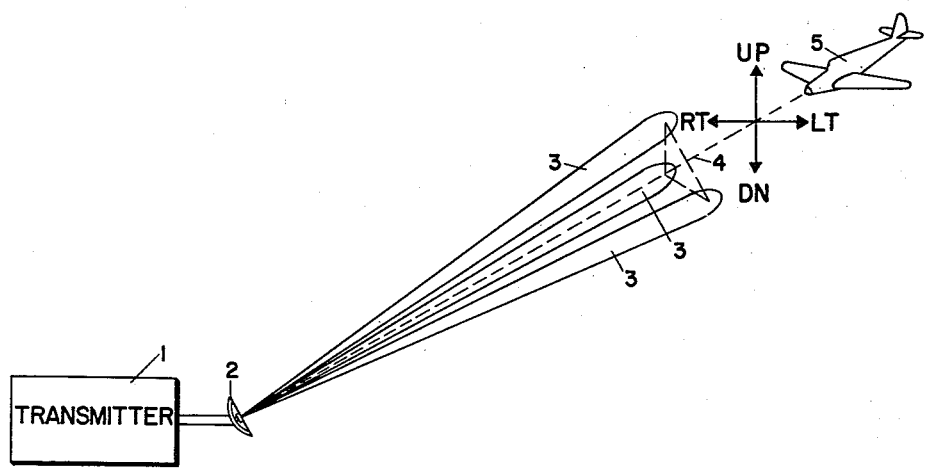
Fig. 1
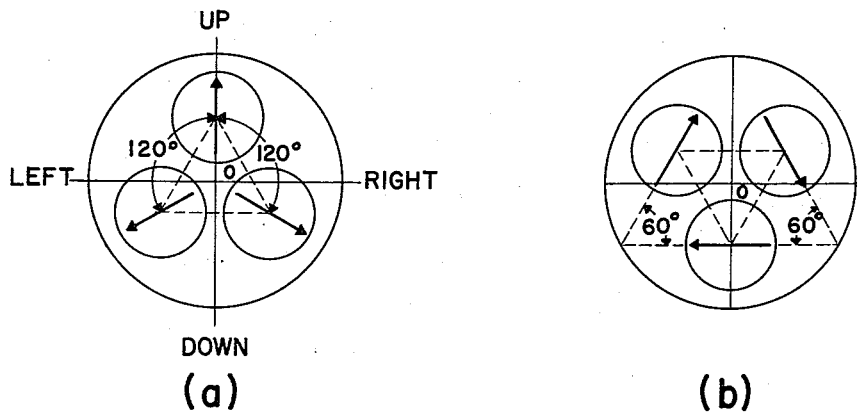
(a)          (b)
Fig. 2.
Jesse L. Butler
INVENTOR.
BY 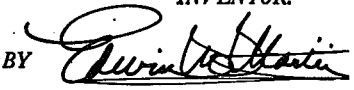
Attorney

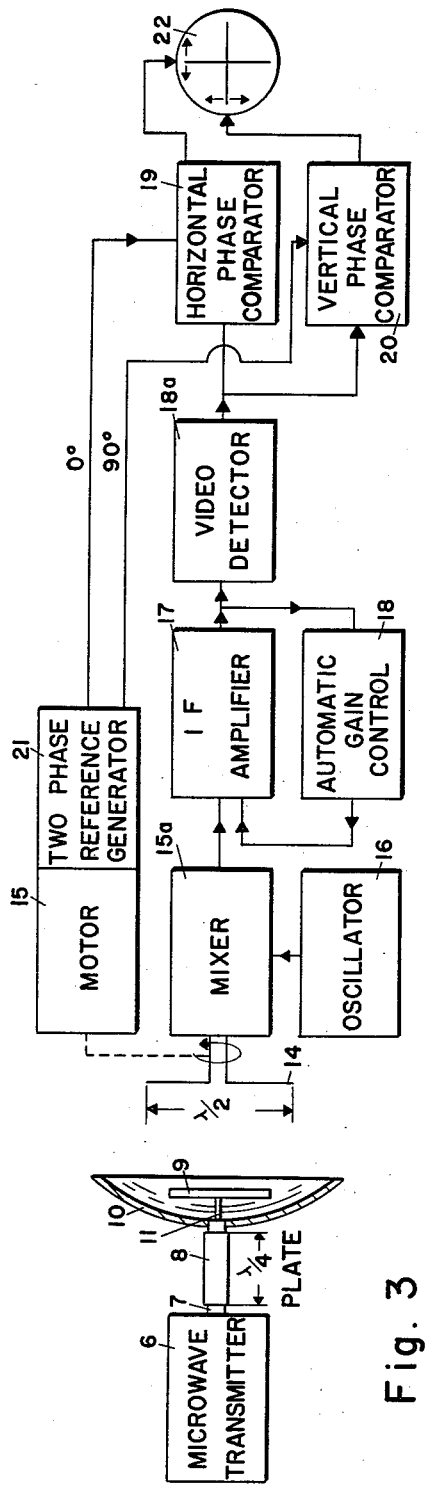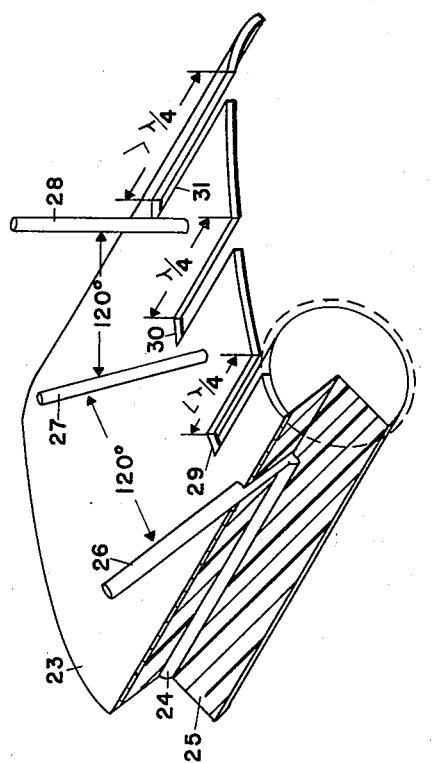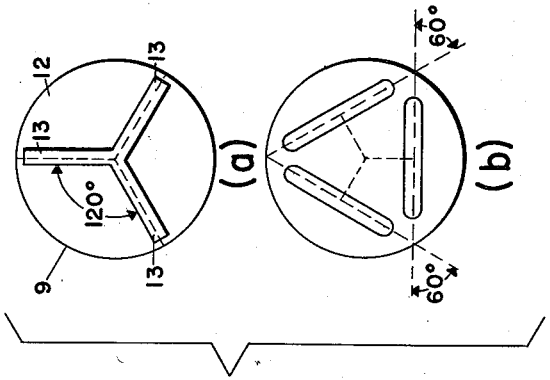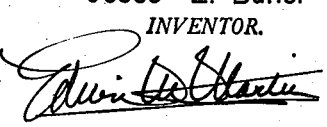

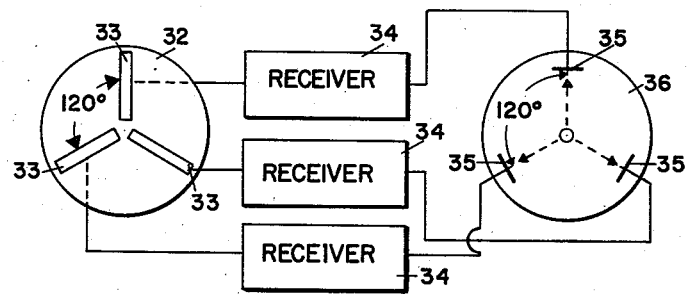
Fig. 7
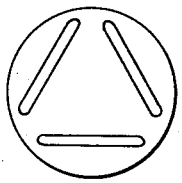
Fig. 8
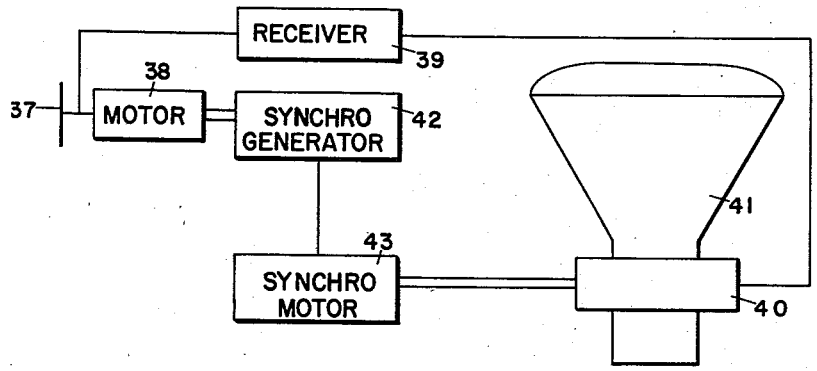
Fig. 9
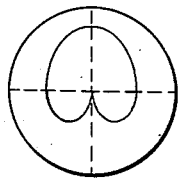
Fig. 10
Jesse L. Butler
*INVENTOR.*
BY 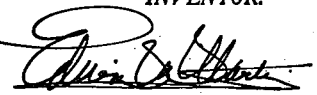
Attorney United States Patent Office 2,822,540
Patented Feb. 4, 1958

2,822,540

AIRCRAFT INSTRUMENT LANDING SYSTEM

Jesse L. Butler, Nashua, N. H., assignor, by mesne assignments, to Sanders Associates, Inc., Nashua, N. H., a corporation of Delaware Application March 17, 1955, Serial No. 494,911

14 Claims. (Cl. 343—108)

The present invention relates to remote control systems utilizing high frequency electromagnetic waves or radio waves. More particularly, the invention is related to instrument landing systems such as are used for the control of aircraft.

In a certain type of prior art instrument landing system a directional beam is transmitted from an airport along a desired glide path. A plurality of modes of modulation of the beam are used to provide the pilot with indications of his horizontal and vertical positions relative to the glide path. The receiving equipment which is located in the aircraft, in accordance with such systems, is relatively complex and costly.

It is therefore an object of the invention to provide an improved aircraft instrument landing system utilizing a unique spatial reference system.

Another object of the present invention is to provide an improved aircraft instrument landing system wherein a unique combination of transmitted beams, plane-polarized at various angles, enables an observer unambiguously to determine his position relative to a preferred control glide path.

A further object of the invention is to provide an improved instrument landing system for aircraft characterized by greater simplicity, economy of construction and reliability of operation than available in systems of the prior art.

Other and further objects of the invention will be apparent from the following description of preferred embodiments thereof, taken in connection with the accompanying drawings and its scope will be pointed out in the appended claims.

In accordance with the present invention there is provided a radio control apparatus. The apparatus comprises a transmitting means having a plurality of radiating member adapted sequentially to radiate at least three plane-polarized beams of high frequency electromagnetic energy characterized by electric vectors mutually so oriented at angles as to provide a static reference coordinate system having at least one pre-selected control path. A receiver is provided responsive to the electromagnetic energy. A polarization discriminator is coupled to the receiver. The discriminator is adapted, in response to the polarized energy, to develop an error signal having an amplitude varying in accordance with the resultant polarization of the beam.

In a preferred embodiment of the invention, an antenna means is provided having at least three co-planar, radiating members radially disposed and oriented in a Y configuration to radiate three plane-polarized beams of energy characterized by electric vectors oriented in a Y pattern to provide a static reference coordinate system having at least one pre-selected control path. A rotatable, polarity-sensitive receiving antenna is included. A receiver is coupled to the antenna and adapted, in response to polarized electromagnetic energy, to develop an error signal having an amplitude varying in accordance with the resultant polarization of said beams. A motor means is provided for rotating the receiving antenna and for driving a reference generator which produces a reference signal. A control means is provided responsive to the error and reference signals to produce a control signal providing an indication of the position of the receiver relative to the control path.

In a modification of the preferred embodiment of the invention, an antenna means is provided having at least three co-planar radiating members which are triangularly disposed and oriented in a delta configuration to radiate three plane-polarized beams of energy characterized by electric vectors oriented in a delta pattern.

In another modification of the preferred embodiment, the receiving antennas comprise a triad of polarity-sensitive elements radially disposed along axes 120 degrees apart. Each of the receiving antenna elements is connected to a separate receiver. The output control voltage of each receiver is applied to its respective deflection plate of a set of three deflecting means of a cathode ray tube to provide thereby an indication of the position of the receiver relative to the preferred glide path.

In a further modification of the preferred embodiment, the transmitting antenna comprises a coaxial transmission line having a cylindrical outer conductor held in insulated spaced relation to a cylindrical inner conductor of lesser diameter. Three antenna elements are connected to the outer conductor and radially disposed 120 degrees apart. Three open-ended slots are formed in the outer conductor and are circumferentially disposed 120 degrees apart, intermediate and equidistant to the antenna elements.

In a still further modification of the preferred embodiment of the invention utilizing a rotatable, polarity-sensitive antenna, a receiver is provided responsive to the output of the antenna. A cathode ray tube has a deflecting yoke connected to the output of the receiver to deflect the beam in accordance with the amplitude of the received signal. A motor drives the antenna. Synchronizing means are coupled to the motor and the deflection yoke to rotate the yoke at a rate twice that of the motor, providing an indication on the face of the cathode ray tube of the position of the receiver relative to the preferred glide path.

The various embodiments of the invention are illustrated in the accompanying drawings in which:

Fig. 1 is a schematic diagram illustrating the operation of the invention;

Fig. 2 presents schematic diagrams illustrating transmitted beam cross-sections of preferred polarization patterns;

Fig. 3 is a schematic diagram, partly in section, of a transmitter and antennas embodying the present invention;

Fig. 4 is a schematic block diagram of a receiver embodying the present invention;

Fig. 5 presents end views illustrating configurations of several antennas such as may be used in the transmitter of Fig. 3;

Fig. 6 is an enlarged, distorted view, partly in section, illustrating one of the transmitting antennas utilized in accordance with the present invention;

Fig. 7 is a schematic diagram of a receiver and antenna illustrating another modified embodiment of the invention;

Fig. 8 is an end view illustrating a modification of the receiving antenna in the receiver of Fig. 7;

Fig. 9 is a schematic block diagram of still another modified embodiment of a receiver embodying the present invention; and Fig. 10 is an end view of the cathode ray tube of the receiver of Fig. 9.

Referring now to the drawings and with particular reference to Figs. 1 and 2, a transmitter 1 provides a source of high frequency electromagnetic energy for an antenna 2 which sequentially radiates three substantially plane-polarized beams 3 of energy, characterized in the axes of polarization by the dispositions of the electric vectors as illustrated in Fig. 2. The beam centers define apexes of an equilateral triangle in a plane perpendicular to the central axis 4 of the system, more particularly as shown in the diagrams (a) and (b) of Fig. 2. An aircraft 5 is indicated in Fig. 1, in a position about to land while following the desired glide path, as indicated by the central axis 4.

In diagram (a) of Fig. 2 the electric vectors are radially oriented at equal angles to form a wye (Y) polarization pattern; and in the diagram (b), the vectors are disposed in the form of a delta polarization pattern. In both cases, triangular radial symmetry exists; i. e., the centers are radially disposed 120 degrees apart relative to the glide path indicated at 0. It will be apparent that a unique pattern of ellipticity exists for every point in space within the effective range of the transmitted beams outside of its axis.

Figs. 3 and 4, in combination, present a preferred embodiment of an improved instrument landing system embodying the present invention. A microwave transmitter 6 operating, for example, at a frequency of 10 kilomegacycles is connected through a dielectric-filled, cylindrical wave guide 7 and a quarter wave plate 8 to an antenna having a primary tripole radiator 9 and a parabolic reflector 10. The radiator 9 is supported by a dielectric radiator shaft 11 and, as shown in Fig. 5, comprises a dielectric insulating disk 12 on which are affixed three conductive radiating members 13, preferably dipoles; i. e., one-half of a wave length long at the operating frequency. The radiating members 13 are disposed at equal angles to form a Y as shown in Fig. 5(a) or a delta as in Fig. 5(b).

In the receiver of Fig. 4 a rotatable antenna element, such as a dipole 14, exhibits maximum response to plane-polarized electromagnetic energy along a preferred axis of polarization. Such an antenna will be hereinafter referred to as polarity-sensitive in the sense of being polarization—axis-sensitive as opposed to being sensitive to the instantaneous polarity of the electric vector. The dipole 14 is mechanically coupled to a motor 15 which rotates the dipole at a frequency $F_0$, for example 200 cycles. The dipole 14 is electrically coupled to a mixer 15a where the energy is heterodyned against the energy of a local oscillator 16 operating, for example, at 9.94 kilomegacycles. The intermediate frequency output of the mixer 15a, for example 60 megacycles, is coupled to an intermediate frequency amplifier 17 where it is amplified and applied to a video detector 18a. An output of the amplifier 17 is coupled to an automatic gain control circuit 18 which, in turn, is coupled in the conventional manner to the amplifier 17 to provide substantially a constant intermediate frequency carrier signal output from the amplifier 17. One output of the detector 18a is coupled to a horizontal phase comparator 19 and another output is coupled to a vertical phase comparator 20.

The motor 15 drives a two-phase reference generator 21 which produces two output reference signals at 0 degrees and 90 degrees, respectively. The frequency of the reference signals is twice that of the motor, for example, 400 cycles. The 0 degree reference signal is coupled to the horizontal phase comparator 19 and the 90 degree reference signal is coupled to the vertical phase comparator 20. The output of the horizontal comparator 19 controls the position of the horizontal indicating strut of a conventional instrument landing system position indicating meter 22. The output of the vertical comparator 20 controls the position of the vertical indicating strut of the meter 22. The position of the receiver relative to the preferred glide path is indicated by the point at which the struts cross.

In Fig. 6 there is presented a modified embodiment of a transmitting antenna which provides three beams in a Y polarization pattern. A coaxial transmission line having a cylindrical outer conductor 23 (shown distorted or flattened in the drawing) concentric with an inner conductor 24 is held in insulated spaced relation by a dielectric insulator material 25, such as polystyrene. The line propagates microwave energy in the well-known TEM mode. The line is terminated in a short circuit by the outer and inner conductors as provided by an antenna member 26 as shown. Antenna members 27 and 28 are so connected to the outer conductor 23 that the members are radially disposed mutually 120 degrees apart as shown. An axially disposed open-ended slot 29 is formed less than a quarter-wave in length at the operating frequency in the outer conductor 23 midway between the antenna elements 26 and 27. An axially disposed open-ended slot 30 is formed substantially a quarter of a wave in length at the operating frequency midway between the antenna elements 27 and 28, and a third axially disposed, open-ended slot 31 is formed greater than a quarter wave in length at the operating frequency midway between the elements 28 and 26. Microwave energy is applied to each of the antenna members 26, 27 and 28 in successive time intervals of one-third of a cycle at the operating frequency and in successive polarities 120 degrees apart, respectively, to radiate three substantially plane-polarized beams, developing thereby a predetermined polarization pattern for the beams to provide a spatial reference coordinate system. (See D. W. Fry and F. K. Goward, "Aerial For Centimetre Wave-Lengths," Cambridge At The University Press, 1950.)

In the embodiment of Fig. 7 a receiving antenna 32 having three members 33 radially disposed at equal angles in the form of a Y are each connected to a separate receiver 34, as shown. The members 33 are preferably dipoles and fixed in position relative to the aircraft receiver. The elements 33 exhibit maximum response to plane-polarized incident energy characterized by an electric vector polarized parallel thereto. Each of the receivers provides an output control, direct voltage which is applied to a deflecting plate 35 of a cathode ray tube 36, as shown. The radiating members 33 may, if desired, be disposed in the form of an equilateral triangle to provide the delta pattern shown in Fig. 8.

In Fig. 9 a further preferred embodiment of a receiving system embodying the present invention comprises a rotatable polarity-sensitive dipole antenna 37 which is mechanically coupled to a motor 38. The dipole 37 is electrically coupled to a receiver 39; the output of the receiver is applied to a deflecting yoke 40 surrounding the neck of a cathode ray tube 41. The motor 38 is coupled to drive a synchro generator 42 which provides a reference control voltage at a frequency twice that of the rotation of the dipole 37. The generator 42 provides power for a synchro motor 43 which is mechanically coupled to the yoke 40 and causes it to rotate about the neck of the cathode ray tube 41 at a rate twice that of the dipole antenna 37. When the plane and its receiver is "up" relative to the desired glide path, an error signal is presented in the form of a cardiod pattern pointing upwardly on the face of the cathode ray tube as shown in Fig. 10.

The operation of the invention will be discussed in more detail with particular reference to Figs. 1, 2, 3, 4 and 5. The microwave energy coupled from the transmitter 6 to the cylindrical wave guide 7 is preferably characterized by the $TE_{1,1}$ mode of propagation. As is well known, the passage of $TE_{1,1}$ energy through the quater-wave plate 8 in the manner of the present invention produces circularly polarized energy in an output cylindrical wave guide (see Southworth, "Theory and Application of Wave Guide Transmission Lines," D. Van Nostrand, 1950). The dielectric radiating shaft 11 couples the circularly polarized energy from the cylindrical wave guide to the tripole antenna. The incidence of circularly polarized energy upon a tripole radiator such as illustrated in Fig. 5(a) causes three beams to be produced having electric vectors each polarized parallel to its respective antenna member 13. It is to be noted that the members 13 are each excited at successive time intervals 120 degrees apart at the operating frequency; i. e., in successive time intervals of one-third of a cycle at the operating frequency. The Y polarization pattern thus produced provides a spatial reference coordinate system as shown in Fig. 2(a) to guide, for example, an aircraft as shown in Fig. 1. When the tripole antenna members are disposed in the configuration of an equilateral triangle, the three transmitted beams are characterized by a delta polarization pattern as shown in Fig. 2(b).

The output of a rotating dipole, or rectangular wave guide, polarity-sensitive antenna element is by definition a function of the character of plane-polarization of a transmitted beam. Thus, in the presence of energy which is uniformly vertically polarized, the dipole produces a minimum signal output when it is horizontally disposed, at cross polarization with the transmitted energy, and a maximum when it is vertically disposed, parallel to the electric vector of the transmitted energy. The output of the dipole is amplitude-modulated microwave energy at a modulation frequency twice that of the rate of rotation of the dipole. This result is readily derivable from the fact that the dipole exhibits every variation in amplitude in only 180 degrees of rotation; i. e., at 0 degree when the dipole is horizontally oriented a minimum amplitude is produced, at 90 degrees when the dipole is vertically oriented a maximum amplitude is produced and at 180 degrees the dipole again produces a signal characterized by a minimum amplitude.

The instantaneous output of the dipole 14 is then a function of the position of the receiver relative to the glide path 0 and its instantaneous angle of rotation. The amplitude and phase of modulation of the modulated signal as produced by the rotating receiving dipole defines the distance of the receiver from the preferred glide path 0 in radians, as well as its vertical and horizontal error components.

The output of the dipole is coupled to the mixer 15a, which may be a crystal diode, and is heterodyned with the 9.94 kilomegacycles output of the oscillator 16 to produce a video modulated 60 megacycles intermediate frequency carrier. The intermediate frequency carrier is amplified by the amplifier 17 and a portion of it is coupled to a conventional automatic gain control circuit 18 which produces a control voltage to vary the gain of the amplifier 17 in the well-known manner. The gain control circuit 18 causes the amplitude of carrier signal output of the amplifier 17 to be maintained substantially constant. The amplifier 17 is coupled to the video detector 18a which comprises a conventional amplitude demodulator circuit and produces in its output only the video modulation signal. The 0 degree reference signal provided by the generator 21 coincides with the position of the dipole physically oriented at 45 degrees. By the application of the 0 degree reference signal and the video output of the detector 18a to the horizontal phase comparator 19, a direct voltage output is produced in which the amplitude varies with the strength of the signal and the sense is positive or negative in accordance with the phase of the video signal being 0 degrees or 180 degrees relative to the 0 degree reference signal. The sense of the output direct voltage of the comparator 19 determines whether the vertical strut of the instrument landing system meter 22 is directed to the left or to the right to provide a visual indication of the horizontal position of the receiver relative to the desired glide path. The 90 degree reference signal is applied to the vertical phase comparator 20 in combination with the video signal. The comparator 20 similarly produces a vertical control, direct voltage to direct the horizontal strut up or down in accordance with the polarity of the vertical control voltage. The comparators 19 and 20 preferably comprise the conventional full-wave bridge phase detectors.

When the receiver is located on the preferred glide path 0, the transmitted beams provide a circularly polarized pattern to a receiving antenna. The output of the rotating dipole 14 is then characterized by an unvarying peak-to-peak amplitude of microwave energy, no error signal is produced. Only when the receiver deviates from the desired glide path is the output of the rotating dipole amplitude-modulated to provide an error signal indicative of the degree and direction of deviation.

The output of the dipole 14 is a function of the vector sum of the polarized energies with respect to both time and space. When, for example, the receiver is "up" relative to the preferred glide path 0, the vertically polarized beam provides larger components of receiver energy than the other two beams. The error signal instantaneously produced by the antenna is the vector sum of the three components. Therefore, the three beams being 120 degrees out of phase, the error signal is proportional to their vector sum in time as well.

The individual transmitting antenna element can be fed simultaneously as opposed to the preferred embodiment. This, however, would have the disadvantage of presenting a null or no signal reception along the glide path. Furthermore, ambiguity would exist along the vertical and horizontal axes; i. e., left from right and up from down would not be distinguishable without an additional sensing mechanism. In the preferred embodiment, the transmitted energy is modulated in time as well as in space and thus inherently provides a unique pattern of ellipticity for each position in space within the range of the transmitting antenna.

The present invention greatly enhances simplicity and reliability of remote control by radio signaling. The sharpness of the null defining the preferred glide path may be controlled by the angle between the central axis of the individual beams and the preferred glide path to provide an indication of error accurate to within ±1 milli-radian. The ready applicability of the present invention to completely automatic positioning systems will be obvious.

While there has been hereinbefore described what are at present considered preferred embodiments of the invention, it will be apparent that many and various changes and modifications may be made with respect to the embodiment illustrated, without departing from the spirit of the invention. It will be understood, therefore, that all such changes and modifications as fall fairly within the scope of the present invention, as defined in the appended claims, are to be considered as a part of the present invention.

What is claimed is:

1. A radio control apparatus, comprising: a transmitting means having a plurality of radiating members adapted sequentially to radiate at least three plane-polarized beams of high frequency electromagnetic energy characterized by electric vectors mutually so oriented at angles as to provide a static reference coordinate system having at least one pre-selected control path; a receiver responsive to said electromagnetic energy; and a polarization discriminator coupled to said receiver and adapted, in response to said polarized electromagnetic energy, to develop an error signal having an amplitude varying in accordance with the resultant polarization of said beams.

2. A radio control apparatus, comprising: an antenna means having at least three coplanar radiating members radially disposed and oriented in a Y configuration to radiate at least three plane-polarized beams of high frequency electromagnetic energy characterized by electric vectors oriented in a Y pattern to provide a static reference coordinate system having at least one pre-selected control path; a transmission means coupled to said antenna means to provide a source of circularly polarized energy for said radiating members whereby said beams are sequentially radiated; a receiver responsive to said electromagnetic energy; and a polarity discriminator coupled to said receiver and adapted, in response to said polarized electromagnetic energy, to develop an error signal having an amplitude varying in accordance with the resultant polarization of said beams.

3. A radio control apparatus, comprising: an antenna means having at least three co-planar radiating members triangularly disposed and oriented in a delta configuration to radiate at least three plane-polarized beams of high frequency electromagnetic energy characterized by electric vectors oriented in a delta pattern to provide a static reference coordinate system having at least one pre-selected control path; a transmission means coupled to said antenna means to provide a source of circularly polarized energy for said radiating members whereby said beams are sequentially radiated; a receiver responsive to said electromagnetic energy; and a polarization discriminator coupled to said receiver adapted in response to said polarized electromagnetic energy to develop an error signal having an amplitude varying in accordance with the resultant polarization of said beams.

4. A radio control apparatus, comprising: a transmitting means having a plurality of radiating members adapted sequentially to radiate at least three plane-polarized beams of high frequency electromagnetic energy characterized by electric vectors mutually oriented at equal angles to provide a static reference coordinate system having at least one pre-selected control path; a rotatable polarity sensitive receiving antenna; a motor means for rotating said antenna; and a receiver coupled to said antenna and adapted, in response to said polarized electromagnetic energy, to develop an error signal having an amplitude varying in accordance with the resultant polarization of said beams.

5. A radio control apparatus, comprising: a transmitting means having a plurality of radiating members adapted sequentially to radiate at least three planepolarized beams of high frequency electromagnetic energy characterized by electric vectors mutually oriented at equal angles to provide a static, spatial reference, coordinate system having at least one pre-selected control path; a receiver responsive to said electromagnetic energy; a polarization discriminator coupled to said receiver and adapted, in response to said polarized electromagnetic energy, to develop an error signal having an amplitude varying in accordance with the resultant polarization of said beams; a generator to provide a reference signal; and control means responsive to said error and reference signals to produce a control signal providing an indication of the position of said receiver relative said control path.

6. An instrument landing system for aircraft, comprising: a fixed transmitting antenna having at least three co-planar, radiating members radially disposed and oriented at substantially equal angles; generator means for providing a source of substantially plane-polarized high frequency electromagnetic energy for said antenna; transmission line means coupling said antenna and generator for applying said energy to each of said antenna members sequentially in time intervals at the operating frequency and in successive polarities 120 degrees apart respectively to radiate at least three substantially plane-polarized beams characterized by electric vectors mutually oriented at equal angles to provide a spatial, reference, coordinate system; a receiver responsive to electromagnetic energy; a polarization discriminator, embodied in said receiver, adapted to develop from said polarized electromagnetic energy an error signal having its amplitude varying in accordance with the resultant polarization of received signals; and means responsive to said error signal providing an indication of the position of said receiver relative to said radiated beams.

7. A radio control apparatus, comprising: an antenna means having a plurality of radiating members so disposed and so oriented with respect to each other as to radiate at least three plane-polarized beams of high frequency electromagnetic energy characterized by electric vectors oriented at mutually equal angles to provide a static reference coordinate system having at least one pre-selected control path; a transmission means coupled to said transmitting means to provide a source of circularly polarized energy for said radiating members whereby said beams are sequentially radiated; a receiver responsive to said electromagnetic energy; and a polarization discriminator coupled to said receiver and adapted, in response to said polarized electromagnetic energy, to develop an error signal having an amplitude varying in accordance with the resultant polarization of said beams.

8. A radio control apparatus, comprising: a transmitting means having a plurality of radiating members adapted sequentially to radiate at least three plane-polarized beams of high frequency electromagnetic energy characterized by electric vectors mutually so oriented at angles as to provide a static reference coordinate system having at least one pre-selected control path, said planes of polarization being mutually so oriented as to provide circular polarization along said control path and elliptical polarization uniquely defining each point in the neighborhood of said path with respect to said path; a receiver responsive to said electromagnetic energy; and a polarization discriminator coupled to said receiver and adapted, in response to said polarized electromagnetic energy, to develop an error signal having an amplitude varying in accordance with the resultant polarization of said beams.

9. An aircraft instrument landing system, comprising: transmitting means having three dipoles radially disposed at equal angles and adapted sequentially to radiate three plane-polarized beams of high frequency electromagnetic energy characterized by electric vectors radially oriented at equal angles to provide a static reference coordinate system having at least one pre-selected control path, whereby said planes of polarization are mutually oriented at equal angles to provide circular polarization along said control path and elliptical polarizations uniquely defining each and every point in the neighborhood of said path with respect to said path; a receiving antenna having a rotatable dipole; a receiver coupled to said receiving antenna; motor means coupled to said rotatable dipole for rotating it; a reference generator means coupled to and driven by said motor means to provide a reference signal with a frequency proportional to the rate of rotation of said rotatable dipole; and comparator means coupled to the output of said reference generator and said receiver to develop an error signal having an amplitude varying in accordance with the resultant polarization of said beams.

10. An aircraft instrument landing system, comprising: transmitting means having three resonant slot radiators radially disposed at equal angles and adapted sequentially to radiate three plane-polarized beams of high frequency electromagnetic energy characterized by electric vectors radially oriented at equal angles to provide a static reference coordinate system having at least one pre-selected control path, whereby said planes of polarization are mutually oriented at equal angles to provide circular polarization along said control path and elliptical polarizations uniquely defining each and every point in the neighborhood of said path with respect to said path; a receiving antenna having a rotatable dipole; a receiver coupled to said receiving antenna; motor means coupled to said rotatable dipole for rotating it; a reference generator means coupled to and driven by said motor means to provide a reference signal with a frequency proportional to the rate of rotation of said rotatable dipole; and comparator means coupled to the output of said reference generator and said receiver to develop an error signal having an amplitude varying in accordance with the resultant polarization of said beams.

11. An aircraft instrument landing system, comprising: transmitting means having three radiating members triangularly disposed at equal angles and adapted sequentially to radiate three plane-polarized beams of high frequency electromagnetic energy characterized by electric vectors radially oriented at equal angles to provide a static reference coordinate system having at least one pre-selected control path, whereby said planes of polarization are mutually oriented at equal angles to provide circular polarization along said control path and elliptical polarizations uniquely defining each and every point in the neighborhood of said path with respect to said path; a receiving antenna having a rotatable dipole; a receiver coupled to said receiving antenna; motor means coupled to said rotatable dipole for rotating it; a reference generator means coupled to and driven by said motor means to provide a reference signal with a frequency proportional to the rate of rotation of said rotatable dipole; and comparator means coupled to the output of said reference generator and said receiver to develop an error signal having an amplitude varying in accordance with the resultant polarization of said beams.

12. An aircraft instrument landing system, comprising: a transmitting means having a plurality of radiating members adapted sequentially to radiate at least three plane-polarized beams of high frequency electromagnetic energy characterized by electric vectors mutually so oriented at angles as to provide a static reference coordinate system having at least one pre-selected control path; a triad of polarity-sensitive elements radially disposed along axes 120 degrees apart; three receivers each coupled to one of said elements; and indicator means including a cathode ray tube having a set of three deflecting plates disposed at substantially equal distances from the axis of the cathode ray along radial axes mutually oriented at equal angles, each of said deflecting plates being coupled to one of said receivers to provide, thereby, a visual indication of the receiver relative to said control path.

13. A radio control apparatus, comprising: a transmitting means; a transmitting antenna coupled to said transmitting means having a coaxial transmission line with a cylindrical outer conductor held in insulated spaced relation, to a cylindrical, inner conductor of lesser diameter, three antenna elements connected to the outer conductor and radially disposed 120 degrees apart, and three open-ended slots formed in said outer conductor and being circumferentially disposed 120 degrees apart, each slot being intermediate and equidistant from a pair of said antenna elements, said antenna being adapted, thereby, sequentially to radiate at least three plane-polarized beams of high frequency energy characterized by electric vectors mutually so oriented at angles as to provide a static reference coordinate system having at least one pre-selected control path; a receiver responsive to said electromagnetic energy; and a polarization discriminator coupled to said receiver and adapted, in response to said polarized electromagnetic energy, to develop an error signal having an amplitude varying in accordance with the resultant polarization of said beams.

14. A radio control apparatus, comprising: a transmitting means having a plurality of radiating members adapted sequentially to radiate at least three plane-polarized beams of high frequency electromagnetic energy characterized by electric vectors mutually so oriented at equal angles to provide a static reference coordinate system having at least one pre-selected control path; a rotatable polarity-sensitive receiving antenna; a motor means for rotating said antenna; a receiver coupled to said antenna and adapted, in response to said polarized electromagnetic energy, to develop an error signal having an amplitude varying in accordance with the resultant polarization of said beams; a cathode ray tube having an electron gun to provide a cathode ray along a central axis to illuminate a fluorescent screen; a rotatable, magnetic, deflection yoke means surrounding said cathode ray and coupled to the output of said receiver; and synchronizing motor means coupled to the first said motor means and said yoke means to rotate said yoke means at twice the rate of rotation of said antenna and provide a visual indication on the fluorescent screen of said cathode ray tube of the position of said receiver relative to said control path.

References Cited in the file of this patent
UNITED STATES PATENTS

| | | |
|---|---|---|
| 2,483,790 | Stanko | Oct. 4, 1949 |
| 2,489,615 | Brittain | Nov. 29, 1949 |
| 2,502,394 | Smith | Mar. 28, 1950 |
| 5,533,599 | Marie | Dec. 12, 1950 |
| 2,613,349 | Kandoian | Oct. 7, 1952 |